United States Patent
Choi et al.

(10) Patent No.: US 9,134,550 B2
(45) Date of Patent: *Sep. 15, 2015

(54) PHOTOREFRACTIVE POLYMER COMPOSITE, AND PHOTOREFRACTIVE DEVICE AND HOLOGRAM DISPLAY DEVICE INCLUDING THE SAME

(71) Applicant: Samsung Electronics Co., Ltd., Suwon-si (KR)

(72) Inventors: Chil-sung Choi, Suwon-si (KR); Kyoung-seok Pyun, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/971,049

(22) Filed: Aug. 20, 2013

(65) Prior Publication Data
US 2014/0133000 A1 May 15, 2014

(30) Foreign Application Priority Data
Nov. 12, 2012 (KR) ........................ 10-2012-0127730

(51) Int. Cl.
G03H 1/02 (2006.01)
G02F 1/00 (2006.01)
G02F 1/01 (2006.01)
G03H 1/26 (2006.01)
G03H 1/04 (2006.01)

(52) U.S. Cl.
CPC ............ *G02F 1/0018* (2013.01); *G02F 1/0126* (2013.01); *G03H 1/26* (2013.01); *G03H 2001/0264* (2013.01); *G03H 2001/048* (2013.01); *G03H 2001/2655* (2013.01); *G03H 2260/54* (2013.01)

(58) Field of Classification Search
CPC .......... G02F 1/0018; G02F 1/01; G02F 1/00; G02F 1/0126; C08L 65/00; C08L 79/00; C08K 3/04; G03H 1/26; G03H 2260/54; G03H 2001/048; G03H 2001/2655; G03H 2001/0264

See application file for complete search history.

(56) References Cited

U.S. PATENT DOCUMENTS

| 8,004,738 B2 | 8/2011 | Yang et al. |
| 2010/0046084 A1 | 2/2010 | Kirita et al. |
| 2011/0157711 A1 | 6/2011 | Tsuji et al. |

(Continued)

FOREIGN PATENT DOCUMENTS

| JP | 2002-080570 | * | 3/2002 |
| JP | 2011053706 A | | 3/2011 |

(Continued)

OTHER PUBLICATIONS

Cheng et al. Thermal fixing of refractive index gratings in a photorefractive polymer, Appl. Phys. Lett., vol. 71(13) pp. 1828-1830 (Sep. 1977).*

(Continued)

*Primary Examiner* — Martin Angebranndt
(74) *Attorney, Agent, or Firm* — Sughrue Mion, PLLC

(57) ABSTRACT

Provided are a photorefractive polymer composite, and a photorefractive devices and hologram display device including the same. The photorefractive polymer composite includes a photoconductive polymer matrix, a nonlinear optical chromophore, a plasticizer, and a graphite-based photocharge generator.

17 Claims, 3 Drawing Sheets

(56) References Cited

U.S. PATENT DOCUMENTS

| | | | |
|---|---|---|---|
| 2011/0293817 A1 | 12/2011 | Hurm et al. | |
| 2013/0128339 A1* | 5/2013 | Gu et al. | 359/299 |
| 2013/0148180 A1 | 6/2013 | Hwang et al. | |
| 2014/0253997 A1* | 9/2014 | Choi et al. | 359/315 |

FOREIGN PATENT DOCUMENTS

| | | | |
|---|---|---|---|
| KR | 10-1018737 B1 | | 3/2011 |
| KR | 1020130106661 A | | 9/2013 |
| KR | 1020140021807 A | | 2/2014 |
| WO | 2012/018342 | * | 2/2012 |

OTHER PUBLICATIONS

Moon et al. "Copoly[6,6'-bis(9-(2-ethylhexyl)carbazole-3-yl)/thieno-(2,5-b)thiophenylidenevinylene] based photorefractive composite: A comparative study on conjugated and non-conjugated polymer systems", Org. Elelectron., vol. 10 pp. 1521-1528 (2009).*

Thomas et al., "Bistriarylamine polymer based composites for photorefractive applications" Adv. Mater., vol. 16(22) pp. 2032-2036 (Nov. 2004).*

Grishina et al. "photoelectric, Nonlinear Optical and photorefractive properties of polyvinyl carbazole composites with graphene", High Energy Chem., vol. 47(2) pp. 46-52 (Mar. 2013).*

Kim et al. "Effect of graphene doping of holographic polymer dispersed liquid crystals", J. Poly. Sci. A:Poly. Chem., vol. 50 1418-1423 (Jan. 2012).*

Jang et al. "Low driving voltage holographic polymer dispersed liquid crystals with chemically incorporated graphene oxide", J. Mater. Chem., vol. 21 pp. 19226-19232 (2011).*

Horhold et al. "Synthesis of TPD containing polymers for use as light emitting materials in electroluminescent devices and laser devices" Proc. SPIE vol. 4105 pp. 431-442 (2001).*

Lingam et al. "Enhanced photorefractivity ina polymeric composite photosensitized with carbon nanoitubes grafted to a photoconductive polymer" J. Appl. Phys. vol. 109 pp. 023106-1 to 023106-10 (Jan. 2011).*

Grishna et al. "Near IR photorefractive composites based on oxidized single wall carbon nanotubes", vol. 24(5) pp. 378-384 (2008).*

Ditte et al., "Innovative sensitizer DiPBI outperforms PCBM", ADv. Mater., vol. 24 pp. 2104-2108 (Mar. 2012).*

Schemme et al., "Effektive Lichtverstarker. Verbundpolymere Fur Holographische Anwendungen". LaborParaxis vol. 36( )6) pp. 20-22 (Oct. 2012).*

Anczykowska, et al., "Enhanced photorefractive effect in liquid crystal structures co-doped with semiconductor quantum dots and metallic nanoparticles", AIP Applied Physics Letters 99, 191109 (2011), Total 4 pages, http://dx.doi.org/10.1063/1.3659485, American Institute of Physics.

Choi, et al., "High-performance photorefractive organic glass based on diphenylhydrazone", AIP Applied Physics Letters 94, 053302 2009, Total 4 pages, http://dx.doi.org/10.1063/1.3077156, AIP Publishing LLC.

Chun, et al., "The effect of the molecular structure of the chromophore on the photorefractive properties of the polymer systems with low glass transition temperatures", Journal of Materials Chemistry 2002, 12, 858-862, First published as an Advance Article on the web Feb. 26, 2002, pp. 858-862, The Royal Society of Chemistry 2002.

Li et al., "Type-II core/shell nanoparticle induced photo refractivity", Applied Physics Letters; No. 98, Jun. 2011, total 4 pages.

Tay et al, "An updatable holographic three-dimensional display", Nature, vol. 451; Feb. 7, 2008, Total 5 pages.

Blanche et al., "Holographic three-dimensional telepresence using large-area photorefractive polymer", Nature, vol. 468, Nov. 4, 2010, Total 4 pages.

Anczykowska et al., "Enhanced photorefractive effect in liquid crystal structures co-doped with semiconductor quantum dots and metallic nanoparticles", Applied Physics letters, vol. 99, 2011, total 4 pages.

* cited by examiner

PHOTOREFRACTIVE POLYMER COMPOSITE, AND PHOTOREFRACTIVE DEVICE AND HOLOGRAM DISPLAY DEVICE INCLUDING THE SAME

CROSS-REFERENCE TO RELATED APPLICATIONS

This application claims priority from Korean Patent Application No. 10-2012-0127730, filed on Nov. 12, 2012 in the Korean Intellectual Property Office, the disclosure of which is incorporated by reference in its entirety.

BACKGROUND

1. Field

The present disclosure relates to photorefractive polymer composites, and photorefractive devices and hologram display devices including the same, and more specifically, to photorefractive polymer composites including a graphite-based photocharge generator, and photorefractive devices and hologram display devices including the photorefractive polymer composites.

2. Description of the Related Art

Active research into photorefractive devices utilizing photorefractive polymer composites has been performed in order to embody holograms. Photorefractive polymer composites simultaneously possess optical nonlinearity and photoconductivity, and they also exhibit spatial modulation of the refractive index due to redistribution of charges generated by irradiated light. Photorefractive devices control the intensity of a beam of light, such as a laser beam, and an electric field in order to modulate a refractive index and thereby reversibly write 3D information. However, typical photorefractive devices are prepared using limited photocharge generators, and require the use of a laser having an intensity as high as 1 W/cm$^2$ to obtain high light conductivity. Accordingly, typical photorefractive devices have poor lifespans and require the use of a highly expensive laser. In addition, typical photorefractive devices have a high applied voltage, which indicates a maximum refraction efficiency, and thus have a high driving voltage.

SUMMARY

One or more embodiments provide photorefractive polymer composites including a graphite-based photocharge generator.

One or more embodiments provide photorefractive devices including photorefractive polymer composites.

One or more embodiments provide hologram display devices including photorefractive devices.

According to an aspect of an embodiment, there is provided a photorefractive polymer composite including: a photoconductive polymer matrix; a nonlinear optical chromophore; a plasticizer; and a graphite-based photocharge generator.

The photoconductive polymer matrix may include a repeating unit having at least one triarylamine moiety.

The photoconductive polymer matrix may be represented by Formula 1 below:

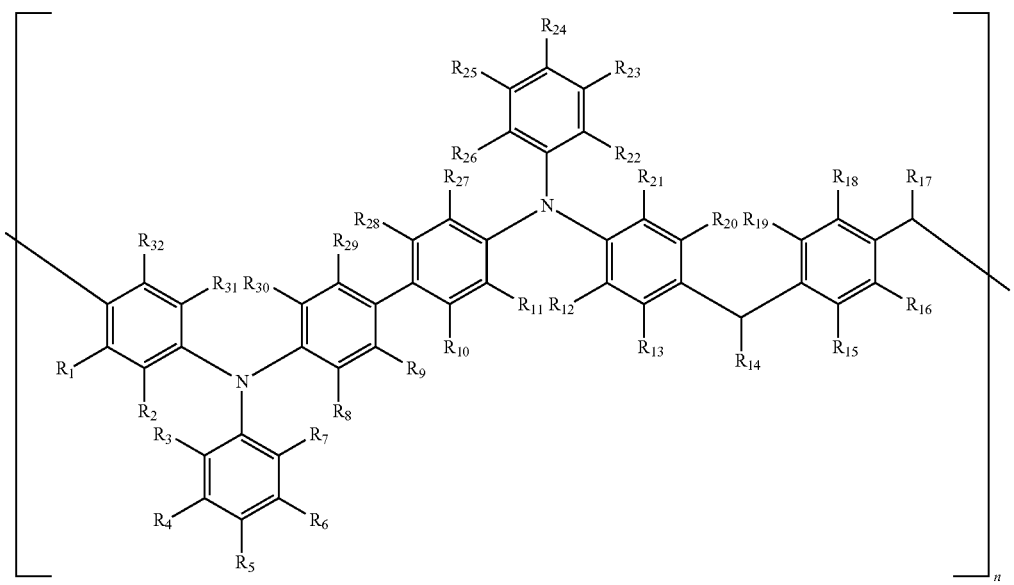

[Formula 1]

In Formula 1, n is an integer of about 10 to about 1,000, and $R_1$ to $R_{32}$ are each independently a hydrogen atom, a linear or branched C1 to C10 alkyl group, a C6 to C11 aryl group, a C5 to C10 heteroaryl group, a C2 to C10 alkene group, a C2 to C10 alkyne group, a C3 to C10 cycloalkyl group, a C3 to C10 cycloalkene group, a C3 to C10 cycloalkyne group, a C1 to C10 heteroalkyl group, a C2 to C10 heteroalkenyl group, or a C2 to C10 heteroalkynyl group.

A weight average molecular weight of the photoconductive polymer matrix may be in a range of from about 5,000 to about 500,000.

An amount of the photoconductive polymer matrix may be in a range of from about 30 to about 70 parts by weight, based on 100 parts by weight of the photorefractive polymer composite.

The nonlinear optical chromophore may include 2-[3-[(E)-2-(piperidino)-1-ethenyl]-5,5-dimethyl-2-cyclohexenyliden]malononitrile (P-IP-DC), 2-{3-[(E)-2-(dibutylamino)-1-ethenyl]-5,5-dimethyl-2-cyclohexenyliden}malononitrile (DB-IP-DC), dicyanostyrene derivative 4-piperidinobenzylidene-malonitrile (PDCST), 2,5-dimethyl-4-(p-phenylazo)anisole (DMNPAA), 4-di(2-methoxyethyl)aminobenzylidene malononitrile (AODCST), 3-(N,N-di-n-butylaniline-4-yl)-1-dicyanomethylidene-2-cyclohexene (DBDC), (2-dicyanomethylene-3-cyano-2,5-dihydrofuran)-6 (DCDHF), 2,N,N-dihexylamino-7-dicyanomethylidenyl-3,4,5,6,10-pentahydronaphthalene (DHADC-MPN), amino-thienyl-dioxocyano-pyridine)-3 (ATOP), (3-(2-(4-(N, N-diethylamino)phenyl)ethenyl)-5,5-dimethyl-1,2-cyclohexenylidene)propanedinitrile (Lemke-E), 1-n-butoxyl-2,5-dimethyl-4-(4'-nitrophenylazo)benzene (BDMNPAB), fluorinated cyano-tolane chromophore (FTCN), diethylamino-nitrostyrene (DEANST), or combinations thereof.

An amount of the nonlinear optical chromophore may be in a range of from about 10 to about 100 parts by weight based on 100 parts by weight of the photoconductive polymer matrix.

The plasticizer may include benzylbutyl phthalate (BBP), diphenyl phthalate (DPP), di-2-ethylhexyl phthalate (DOP), N-ethylcarbazole (ECZ), n-(2-ethylhexyl)-n-(3-methylphenyl)-aniline (EHMPA), dimethylphthalate (DMP), diethylphthalate (DEP), diisobutylphtalate (DIBP), dibutylphtalate (DBP), diheptylphtalate (DHP), dioctyl phthalate (DIOP), di-n-octyl phthalate (DnOP), dinonylphthalate (DNP), diisodecylphthalate (DIDP), ditridecylphthalate (DTDP), dicyclohexyl phthalate (DCHP), butyllauryl phthalate (BLP), dioctyl adipate (DOA), diisodecyl adipate (DIDA), dioctyl azelate (DOZ), dibutyl sebacate (DBS), dioctyl sebacate (DOS), dioctyl terephthalate (DOTP), diethylene glycol dibenzoate (DEDB), butyl oleate (BO), tricresyl phosphate (TCP), trioctyl phosphate (TOP), triphenyl phosphate (TPP), trichloroethyl phosphate (TCEP), or combinations thereof.

An amount of the plasticizer may be in a range of from about 10 to about 40 parts by weight based on 100 parts by weight of the photoconductive polymer matrix.

The graphite-based photocharge generator may include graphite, graphene, graphene oxide (GO), reduced graphene oxide (RGO), or combinations thereof.

An amount of the graphite-based photocharge generator is in a range of from about 0.001 to about 1.0 parts by weight based on 100 parts by weight of the photoconductive polymer matrix.

According to an aspect of another embodiment, there is provided a photorefractive device including: a first electrode; a second electrode facing the first electrode; and the photorefractive polymer composite described above interposed between the first electrode and the second electrode.

According to an aspect of another embodiment, there is provided a hologram display device including the photorefractive device described above.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
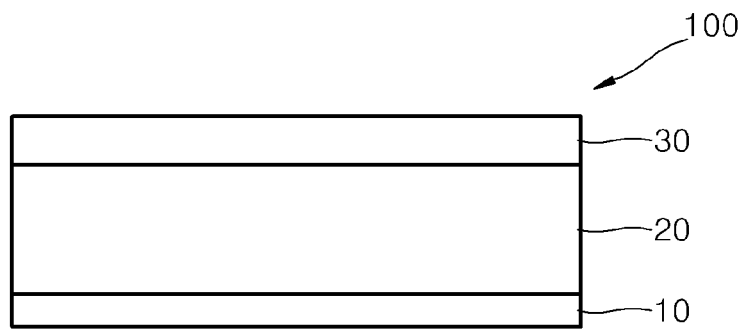
FIG. 1 is a schematic cross-sectional view of a photorefractive device according to an embodiment.

Reference will now be made in detail to embodiments, examples of which are illustrated in the accompanying drawings, wherein like reference numerals refer to like elements throughout. In this regard, the embodiments herein should not be construed as being limited to the descriptions set forth herein. Although the embodiments herein are described with reference to the figures, the figures should not be understood as limiting the embodiments. As used herein, expressions such as "at least one of," when preceding a list of elements, modify the entire list of elements.

A photorefractive polymer composite according to an embodiment of the present invention is described herein in detail.

A photorefractive polymer composite according to an embodiment includes a photoconductive polymer matrix, a nonlinear optical chromophore, a plasticizer, and a graphite-based photocharge generator (or a photosensitizer). The term "graphite-based photocharge generator" used herein refers to graphite or a photocharge generator derived from graphite.

The nonlinear optical chromophore, the plasticizer, and the graphite-based photocharge generator may exist in a dispersed state in the photoconductive polymer matrix. Alternatively, they may individually exist in discrete regions within the polymer matrix.

The photoconductive polymer matrix is a material having an electric conductivity that improves when it absorbs electromagnetic radiation. The electromagnetic radiation may include visible light, ultraviolet (UV) rays, infrared rays, or the like. The photoconductive polymer matrix may move charges generated in the photorefractive polymer composite as a result of irradiation by, e.g., light, changing the spatial ratio of holes and electrons and thereby inducing an electric filed in the photorefractive polymer composite.

The photoconductive polymer matrix may include a repeating unit having at least one triarylamine moiety.

In an embodiment, the photoconductive polymer matrix may include a repeating unit having two triarylamine moieties. In detail, the photoconductive polymer matrix may be represented by Formula 1 below:

[Formula 1]

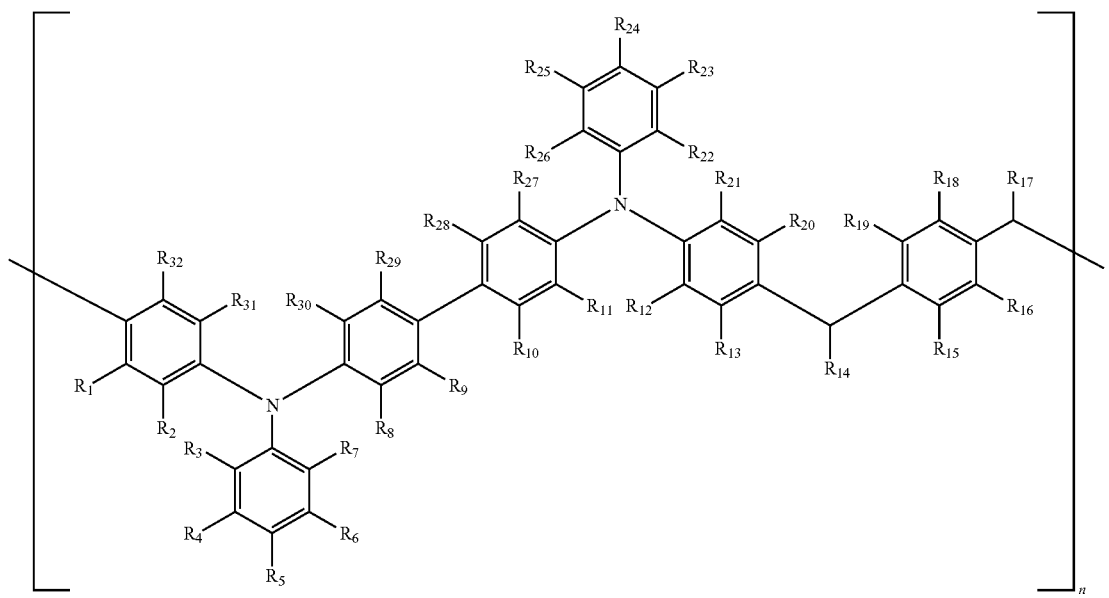

In Formula 1, n is an integer of from about 10 to about 1,000, and $R_1$ to $R_{32}$ are each independently a hydrogen atom, an optionally substituted linear or branched C1 to C10 alkyl group, an optionally substituted C6 to C11 aryl group, an optionally substituted C5 to C10 heteroaryl group, an optionally substituted C2 to C10 alkene group, an optionally substituted C2 to C10 alkyne group, an optionally substituted C3 to C10 cycloalkyl group, an optionally substituted C3 to C10 cycloalkene group, an optionally substituted C3 to C10 cycloalkyne group, an optionally substituted C1 to C10 heteroalkyl group, an optionally substituted C2 to C10 heteroalkenyl group, or an optionally substituted C2 to C10 heteroalkynyl group.

In detail, in Formula 1, n may be in a range of from about 20 to about 100; $R_1$ to $R_4$, $R_6$ to $R_{13}$, $R_{15}$ to $R_{23}$, and $R_{25}$ to $R_{32}$ may be hydrogen atoms; and $R_5$, $R_{14}$, and $R_{24}$ may be each independently a hydrogen atom, a linear or branched C1 to C10 alkyl group, a C6 to C11 aryl group, a C5 to C10 heteroaryl group, a C2 to C10 alkene group, a C2 to C10 alkyne group, a C3 to C10 cycloalkyl group, a C3 to C10 cycloalkene group, a C3 to C10 cycloalkyne group, a C1 to C10 heteroalkyl group, a C2 to C10 heteroalkenyl group, or a C2 to C10 heteroalkynyl group.

In Formula 1, the two end groups may be each independently hydrogen or a methyl group (—CH$_3$).

In other embodiments, the photoconductive polymer matrix may include a repeating unit having one triarylamine moiety. In detail, the photoconductive polymer matrix may be represented by Formula 2 below:

[Formula 2]

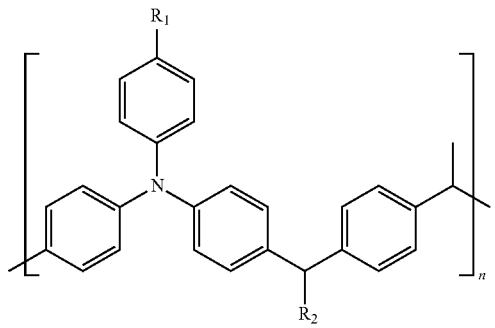

In Formula 2, n may be in a range of from about 1 to about 1,000, and $R_1$ and $R_2$ are defined as above.

In Formula 2, the two end groups may be each independently hydrogen or a methyl group (—CH$_3$).

The photoconductive polymer matrix may further include one or more additional photoconductive polymer matrices. The other photoconductive polymer matrix may include polyvinylcarbazole (PVK), polysiloxane carbazole, polyparaphenylenevinylene, polypyrrole, polythiophene, polyalkylthiophene, carbazole-substituted polysiloxane (PSX-Cz), poly(p-phenylene terephthalate) carbazole (PPT-CZ), polyacrylate triphenylamine (TATPD), derivatives of these, mixtures of these, or copolymers of these.

A weight average molecular weight of the photoconductive polymer matrix of Formula 1 or 2, or the one or more additional photoconductive polymer matrix, may be in a range of from about 5,000 to about 500,000, and for example, in the range of from about 10,000 to about 50,000. When the weight average molecular weight of the photoconductive polymer matrix or the other photoconductive polymer matrix is within this range (i.e., from about 5,000 to about 500,000), a photorefractive device having a high electric stability may be obtained, which means it does not break down when an electric field is applied thereto. Further, within this range of molecular weights, the solubility in a solvent of the photoconductive polymer matrix or the one or more additional photoconductive polymer matrix may be appropriate for ease of use in the manufacturing of a photorefractive device.

An amount of the photoconductive polymer matrix may be in a range of from about 30 to about 70 parts by weight, for example, 40 to 55 parts by weight based on 100 parts by weight of the photorefractive polymer composite. When the amount of the photoconductive polymer matrix is within this range (i.e., from about 30 to about 70 parts by weight), a photorefractive device having a high photoconductivity may be obtained, having a high inner space charge field, such that a low applied voltage may be used. The photorefractive device may exhibit a photorefractive phenomenon even at room temperature (for example, about 25° C.).

The nonlinear optical chromophore is activated as a result of an electric field induced inside the photorefractive polymer composite that results in a change in the spatial refractive index. That is, the nonlinear optical chromophore is initially arranged as the result of an external electric field, and is then rearranged as the result of an interior space charge field generated as a result of photoconductivity.

The nonlinear optical chromophore may include 2-[3-[(E)-2-(piperidino)-1-ethenyl]-5,5-dimethyl-2-cyclohexenyliden] malononitrile (P-IP-DC), 2-{3-[(E)-2-(dibutylamino)-1-ethenyl]-5,5-dimethyl-2-cyclohexenyliden}malononitrile (DB-IP-DC), dicyanostyrene derivative 4-piperidinobenzylidene-malonitrile (PDCST), 2,5-dimethyl-4-(p-phenylazo)anisole (DMNPAA), 4-di(2-methoxyethyl)aminobenzylidene malononitrile (AODCST), 3-(N,N-di-n-butylaniline-4-yl)-1-dicyanomethylidene-2-cyclohexene (DBDC), (2-dicyanomethylene-3-cyano-2,5-dihydrofuran)-6 (DCDHF), 2,N,N-dihexylamino-7-dicyanomethylidenyl-3,4,5,6,10-pentahydronaphthalene (DHADC-MPN), amino-thienyl-dioxocyano-pyridine)-3 (ATOP), (3-(2-(4-(N,N-diethylamino)phenyl)ethenyl)-5,5-dimethyl-1,2-cyclohexenylidene)propanedinitrile (Lemke-E), 1-n-butoxyl-2,5-dimethyl-4-(4'-nitrophenylazo)benzene (BDMNPAB), fluorinated cyano-tolane chromophore (FTCN), diethylamino-nitrostyrene (DEANST), or combinations thereof. Preferred nonlinear optical chromophores are 2-[3-[(E)-2-(piperidino)-1-ethenyl]-5,5-dimethyl-2-cyclohexenyliden] malononitrile (P-IP-DC), and 2-{3-[(E)-2-(dibutylamino)-1-ethenyl]-5,5-dimethyl-2-cyclohexenyliden}malononitrile (DB-IP-DC). The chemical structures of representative compounds are listed below:

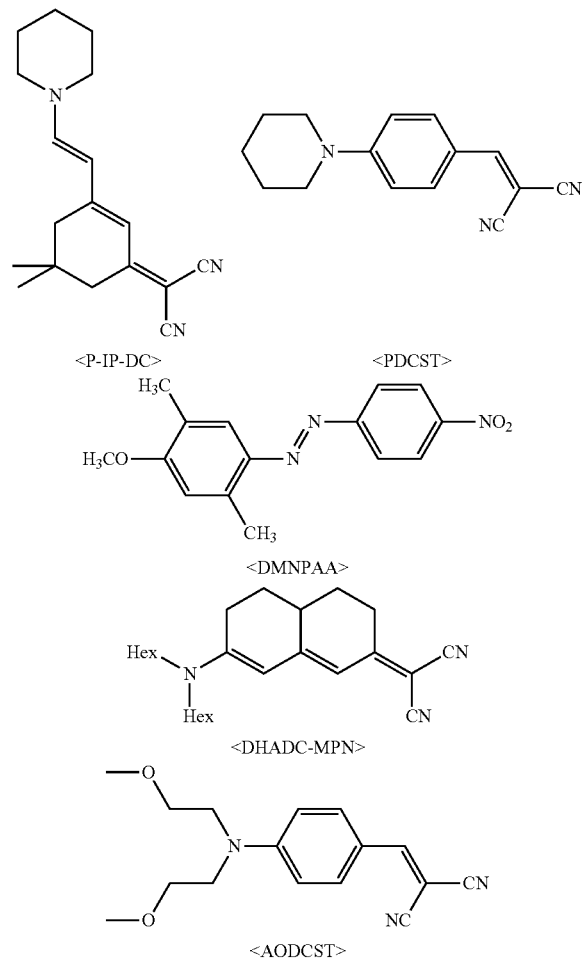

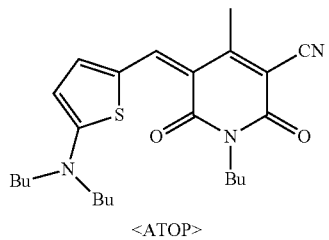

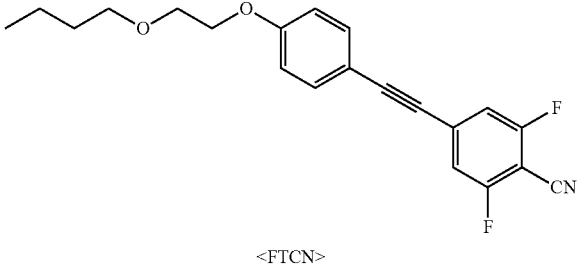

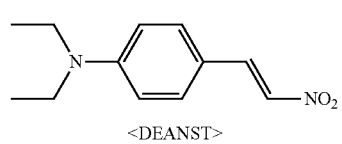

An amount of the nonlinear optical chromophore may be in a range of from about 10 to about 100 parts by weight, for example, from about 50 to about 70 parts by weight, based on 100 parts by weight of the photoconductive polymer matrix. When the amount of the nonlinear optical chromophore is within this range (i.e., from about 10 to about 100 parts by weight), a photorefractive device may be obtained having high birefringence even at a low applied voltage. Such a photo refractive device may be manufactured easily and has high electric stability because particles of the nonlinear optical chromophore do not agglomerate with each other.

The plasticizer may contribute to a decrease in the glass transition temperature of the photorefractive polymer composite, such that the degree of freedom of the photorefractive polymer composite is increased. As a result, orientational enhancement may result in improved photorefractive efficiency (for example, improved refraction efficiency).

The plasticizer may include benzylbutyl phthalate (BBP), diphenyl phthalate (DPP), di-2-ethylhexyl phthalate (DOP), N-ethylcarbazole (ECZ), n-(2-ethylhexyl)-n-(3-methylphenyl)-aniline (EHMPA), dimethylphthalate (DMP), diethylphthalate (DEP), diisobutylphtalate (DIBP), dibutylphtalate (DBP), diheptylphtalate (DHP), dioctyl phthalate (DIOP), di-n-octyl phthalate (DnOP), dinonylphthalate (DNP), diisodecylphthalate (DIDP), ditridecylphthalate (DTDP), dicyclohexyl phthalate (DCHP), butyllauryl phthalate (BLP), dioctyl adipate (DOA), diisodecyl adipate (DIDA), dioctyl azelate (DOZ), dibutyl sebacate (DBS), dioctyl sebacate (DOS), dioctyl terephthalate (DOTP), diethylene glycol dibenzoate (DEDB), butyl oleate (BO), tricresyl phosphate (TCP), trioctyl phosphate (TOP), triphenyl phosphate (TPP), trichloroethyl phosphate (TCEP), or combinations thereof. A preferable plasticizer is benzylbutyl phthalate.

An amount of the plasticizer may be in a range of from about 10 to about 40 parts by weight, for example, in the range of from about 15 to about 25 parts by weight, based on 100 parts by weight of the photoconductive polymer matrix. When the amount of the plasticizer is within this range (i.e., from about 10 to about 40 parts by weight), a photorefractive device that exhibits a photorefractive phenomenon even at room temperature (about 25° C.) may be obtained. The photorefractive device may maintain a high electric stability even when high voltage is applied thereto.

The graphite-based photocharge generator may be excited by a light source having one or more of various wavelengths, for example, visible light wavelengths, to generate electrons and holes. The graphite-based photocharge generator has, as compared to typical photocharge generators, many advantages. First, a photorefractive device having high photoconductivity may be obtained, even when a low intensity laser is used as a light source. Second, a photorefractive device having an excellent lifespan which uses a cheap laser may be obtained. Third, a photorefractive device having a low operating voltage may be obtained because an voltage applied thereto, which indicates a maximum refraction efficiency, is low.

The graphite-based photocharge generator may include graphite, graphene, graphene oxide (GO), reduced graphene oxide (RGO) or combinations thereof.

Oxygen content in the graphene oxide may be in a range of from about 15 to about 30 wt %. Preferably, oxygen content in the graphene oxide is in the range of from about 20 to about 25 wt %.

Oxygen content in the reduced graphene oxide may be in a range of from about 1.5 to about 10 wt %. Preferably, oxygen content in the reduced graphene oxide is in the range of from about 3 to about 7 wt %.

An amount of the graphite-based photocharge generator may be in a range of from about 0.001 to about 1.0 parts by weight, for example, from about 0.05 to about 0.5 parts by weight, based on 100 parts by weight of the photoconductive polymer matrix. When the amount of the graphite-based photocharge generator is within this range (i.e., from about 0.001 to about 1.0 parts by weight), the thus-obtained obtained photorefractive device may have excellent photorefractive characteristics and high electric stability, and may not undergo a beam fanning phenomenon.

The photorefractive polymer composite may further include a co-photocharge generator or co-photosensitizer.

The co-photocharge generator or co-photosensitizer may include C60 fullerene, phenyl-C61-butyric acid methyl ester (PCBM), 2,4,7-trinitrofluorenone (TNF), 2,4,7-trinitro-9-fluorenylidene-malononitrile (TNFDM), or combinations thereof. Representative structures of these materials are shown below:

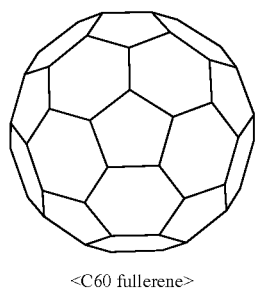

<C60 fullerene>

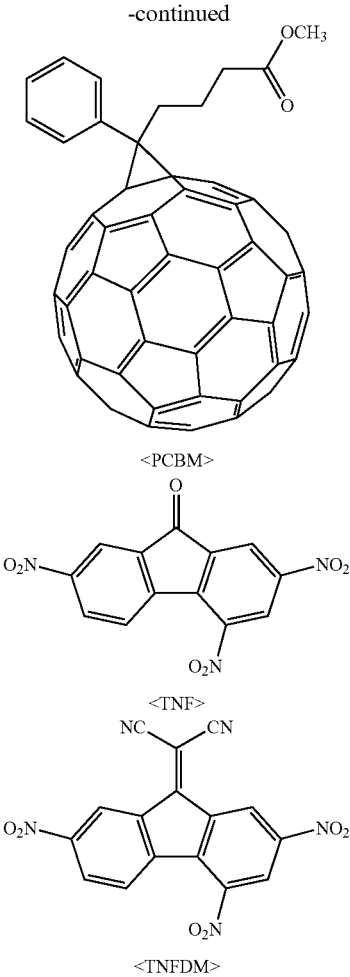

<PCBM>

<TNF>

<TNFDM>

As follows, a photorefractive device and a hologram display device according to an embodiment are described in detail with reference to the attached drawings.

FIG. 1 is a schematic cross-sectional view of a photorefractive device 100 according to an embodiment.

Referring to FIG. 1, the photorefractive device 100 according to the present embodiment includes a first electrode 10, a second electrode 30 facing the first electrode 10, and a photorefractive layer 20 interposed between the first electrode 10 and the second electrode 30. The material used for the first electrode 10 is not particularly limited, and may include Au, Al, indium tin oxide (ITO), indium zinc oxide (IZO), or the like. The material used for the second electrode 30 is also not particularly limited, and may include the same or different material as used in the first electrode 10.

The photorefractive layer 20 may include the photorefractive polymer composite described herein.

When coherent light having a single wavelength is irradiated onto the photorefractive layer 20, charges are generated where constructive interference occurs. The charges move, thereby generating an internal electric field. As a result of the internal electric field, the spatial refractive index of the photorefractive layer 20 changes, and thus a refractive lattice may be formed. The refractive pattern formed in the photorefractive device 100 contains three-dimensional image information, and thus, when a reference beam is irradiated thereon, a three-dimensional image is formed in the vicinity of the photorefractive device 100.

The photorefractive device 100 may be used as a spatial light modulator (SLM).

The photorefractive device 100 includes a photorefractive polymer composite comprising a graphite-based photocharge generator. Because a photorefractive polymer composite is included, even when a laser having an intensity of 0.1 W/cm$^2$ or lower is used as a light source, a photorefractive device 100 having excellent photoconductivity and lifetime characteristics may be obtained. In addition, the photorefractive device 100 may use a cheap laser as a light source, and use a low applied voltage (i.e., driving voltage), which indicates the maximum refraction efficiency.

Figure 2:
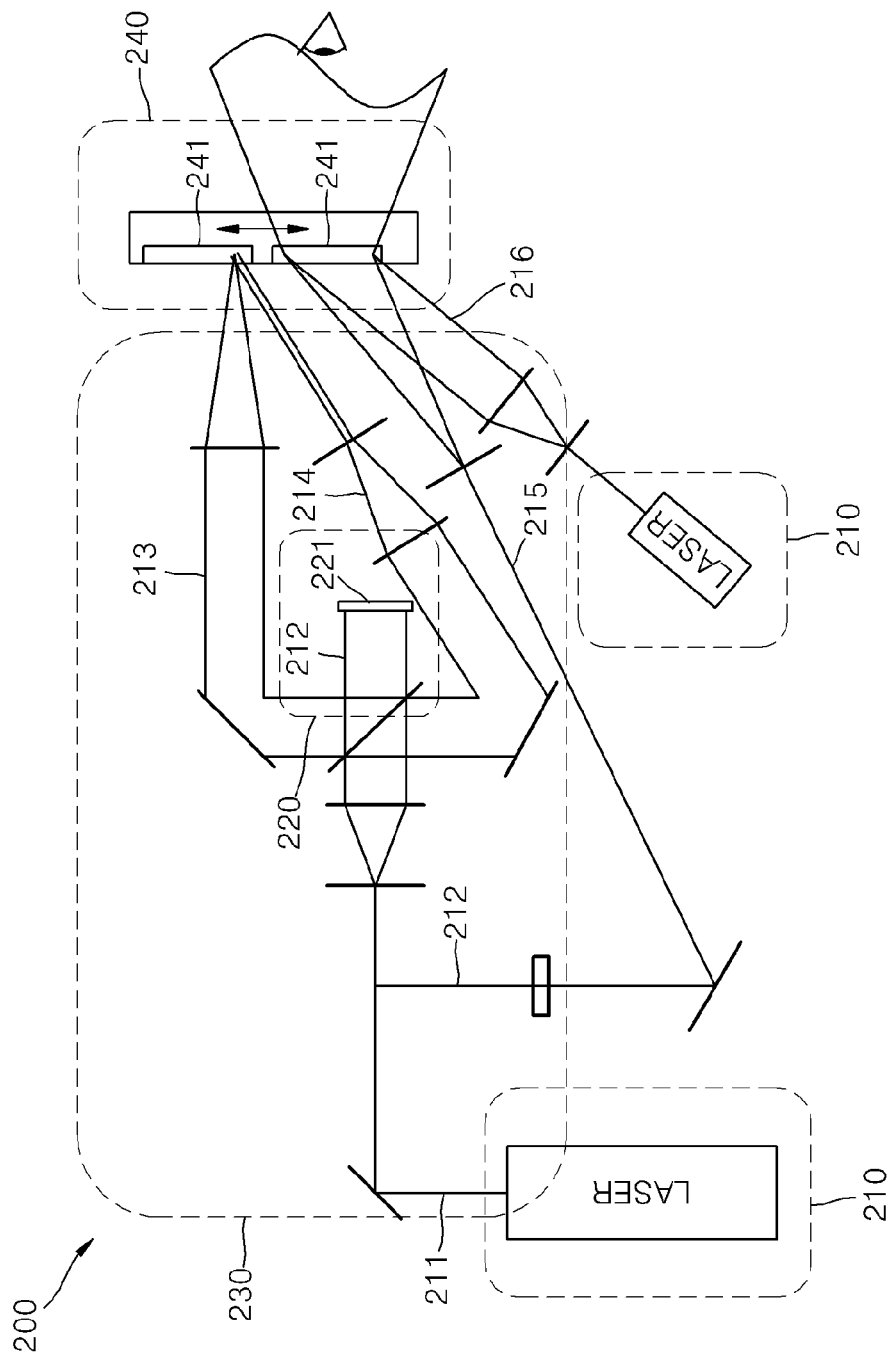
FIG. 2 is a schematic cross-sectional view of a hologram display device according to an embodiment.

Turning to FIG. 2, a photorefractive device 200 according to an embodiment may be efficiently used in three-dimensional (3D) printers, 3D displays, real-time stereoscopic holography, light computing, 3D information storage, or detection of nano-sized errors using a non-destructive hologram.

FIG. 2 is a schematic cross-sectional view of a hologram display device 200 according to an embodiment.

Referring to FIG. 2, the hologram display device 200 includes light source units 210, an input unit 220, an optical unit 230, and a display unit 240.

A light source unit 210 emits a laser beam that is used by the input unit 220 and the display unit 240 to provide, write, and reproduce 3D image information belonging to an object.

The input unit 220 inputs in advance 3D image information of the object to be written on the display unit 240. The input unit 220 may input to an electrically addressed liquid crystal (SLM) 221 such 3D information as, for example, the intensity and phase of light according to space. In this regard, an input beam 212 may be used.

The optical unit 230 may include a mirror, a polarizer, a beam splitter, a beam shutter, a lens, and the like. The optical unit 230 may divide a laser beam 211 emitted from the light source unit 210 into an input beam 212 to be transmitted to the input unit 220, a writing beam 213 to be transmitted to the display unit 240, a reference beam 214, an erase beam 215, a read beam 216, and the like.

The display unit 240 receives the 3D image information of the object from the input unit 220, writes it to a hologram plate 241 comprising an optically addressed SLM, and reproduces a 3D image of the object. In this regard, the 3D image information of the object may be written by interference between the input beam 213 and the reference beam 214. The optically addressed SLM of the hologram plate 241 may be the photorefractive device 100 of FIG. 1. The 3D image information of the object written in the hologram plate 241 may be reproduced into a 3D image via a refraction pattern generated by the read beam 216. The erase beam 215 may be used to quickly remove the formed refraction pattern. In addition, the hologram plate 241 may be moved between a location where a 3D image is input and a location where the 3D image is reproduced.

The hologram display device 200 according to an embodiment uses the photorefractive device 100 of FIG. 1 as the optically addressed SLM of the hologram plate 241 to have a high optical modulation speed, thereby improving a screen conversion speed.

The photorefractive polymer composite and the photorefractive device 100 may be used in various other hologram display devices, in addition to the hologram display device 200.

Hereinafter, one or more embodiments are described in detail. However, the present disclosure is not limited thereto.

EXAMPLE

Preparation Example 1

Synthesis of Reduced Graphene Oxide (RGO)

Graphite was acid-treated using a Hummers method as follows. First, 1 g of graphite was dispersed in sulfuric acid at a temperature of 0° C. to prepare a graphite dispersion. Then, 2 g of sodium acetate was added to the graphite dispersion and dissolved therein for 10 minutes. Thereafter, 12 g of potassium permanganate was added to the graphite dispersion and dissolved therein for 10 minutes, and the resultant mixture was maintained at room temperature (25° C.) for 12 hours to facilitate oxidation of the graphite. When the oxidation reaction was terminated, the resultant mixture was added to 2 L of distilled water and the mixture was stirred, and 20 mL of hydrogen peroxide was added thereto to remove the potassium permanganate. As a result, a graphene oxide (GO) dispersion was obtained. Subsequently, the GO dispersion was centrifuged to be separated into distilled water and GO. The separated GO was washed several times to control its pH to a value between 6 and 7, and then it was dried using a freezing drier, thus obtaining GO (oxygen content: 28.6 wt %). 1 g of the obtained GO was added to 1,000 mL of distilled water and then sonicated to completely disperse the GO and to obtain an aqueous dispersion of GO. 10 mL of hydrazine hydrate was added to the GO aqueous solution and the resultant mixture was maintained at a temperature of 100° C. for 24 hours to facilitate the reduction of GO. After the reduction reaction was terminated, the resulting mixture was filtered to obtain a solid content, and then the solid content was washed 2 to 3 times with an aqueous ethanol solution (prepared by mixing water and ethanol at a volume ratio of 1:1). Thereafter, the washed solid content was vacuum dried at a temperature of 180° C. to obtain a reduced graphene oxide (RGO) (oxygen content: 6.3 wt %).

Example 1

Preparation of Photorefractive Polymer Composite and Photorefractive Device

In Example 1, a conjugate triphenylamine (Con-TPD; n=30; two end groups: methyl group (—$CH_3$); and weight average molecular weight=180,000) represented by Formula 3 below was used as a photoconductive polymer, 2-[3-[(E)-2-(piperidino)-1-ethenyl]-5,5-dimethyl-2-cyclohexenyliden] malononitrile (P-IP-DC) was used as a nonlinear optical chromophore, benzylbutyl phthalate (BBP) was used as a plasticizer, and RGO prepared according to Preparation Example 1 was used as a photocharge generator.

[Formula 3]

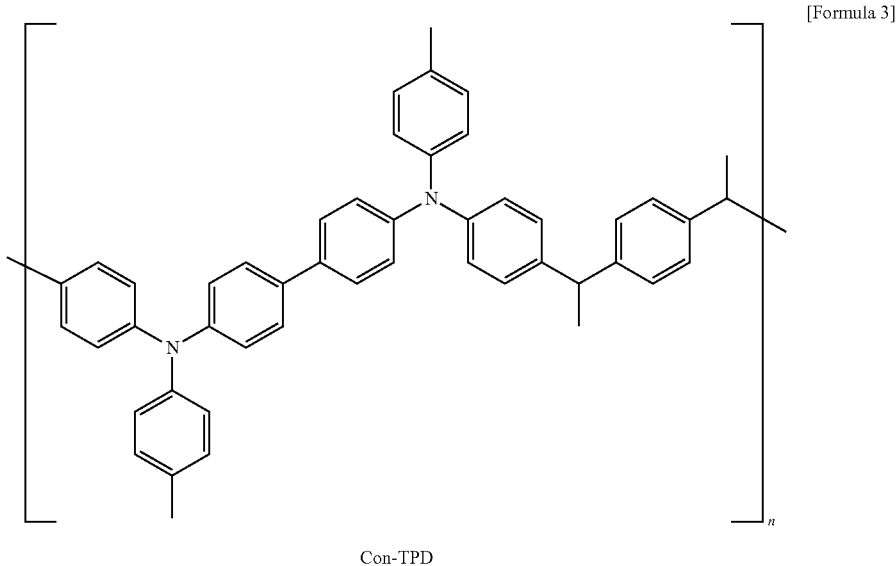

Con-TPD

First, 0.05 mg of RGO was added to 0.5 mL of dimethyl formamide (DMF) and the RGO was dissolved using an ultrasound diffuser. Then, 55 mg of the photoconductive polymer, 30 mg of the nonlinear optical chromophore, and 15 mg of the plasticizer were further added thereto and dispersed to obtain a coating composition. The coating composition was dropped onto an ITO-coated glass substrate that had been heated to have a temperature of 60° C. through a filter membrane (average pore size: 0.2 μm). The ITO-coated glass substrate was placed into a reducing oven (0.01 mmHg) at a temperature of 60° C. for 12 hours, thereby removing solvent (DMF) from the composition and obtaining a photorefractive polymer composite precursor film. Two TEFLON spacers (each having a thickness of 100 μm) were disposed next to the photorefractive polymer composite precursor film, and a second ITO-coated glass substrate was used to cover the resultant structure. The photorefractive polymer composite precursor film interposed between the two ITO-coated glass substrates was softened on a hot plate at a temperature of 120° C. for 5 minutes, thereby completing the manufacturing of a photorefractive device including two ITO-coated glass substrates and the photorefractive polymer composites interposed therebetween. Thereafter, to increase the uniformity of the thickness of the photorefractive device, the photorefractive device was maintained at a temperature of 120° C. for 10 minutes, and then the photorefractive device was quickly cooled using dry ice.

Example 2 and Comparative Example 1

Preparation of Photorefractive Polymer Composite and Photorefractive Device

A photorefractive polymer composite and a photorefractive device were prepared in the same manner as in Example 1, except that the amount of RGO (i.e., photocharge generator) used was changed as shown in Table 1.

Comparative Example 2

Preparation of Photorefractive Polymer Composite and Photorefractive Device

A photorefractive polymer composite and a photorefractive device were prepared in the same manner as in Example 1, except that phenyl-$C_{61}$-butyric acid methyl ester (PCBM) was used as a photocharge generator instead of RGO.

The compositions and glass transition temperatures (Tg) of the photorefractive polymer composites of Examples 1 and 2 and Comparative Examples 1 and 2 are shown in Table 1.

TABLE 1

|  | Photoconductive polymer and content thereof (mg) | Nonlinear optical chromophore (P-IP-DC) content (mg) | Plasticizer (BBP) content (mg) | Photocharge generator and content thereof (mg) | Glass transition temperature (Tg) (° C.) of photoconductive polymer composite |
|---|---|---|---|---|---|
| Example 1 | Con-TPD: 55 | 30 | 15 | RGO: 0.05 | 29 |
| Example 2 | Con-TPD: 55 | 30 | 15 | RGO: 0.5 | 30 |
| Comparative Example 1 | Con-TPD: 55 | 30 | 15 | 0.0 | 29 |
| Comparative Example 2 | Con-TPD: 55 | 30 | 15 | PCBM: 0.05 | 29 |

The glass transition temperatures (Tg) shown in Table 1 were measured at a speed of 10° C./min using a differential scanning calorimeter (TA Instruments Company, DSC Q100).

Evaluation Example

The phase stability, photoconductivity, gain factor, applied voltage for maximum diffraction efficiency, and maximum diffraction efficiency of the photorefractive devices (or photorefractive polymer composites) of Examples 1 and 2 and Comparative Examples 1 and 2 were evaluated as follows and the results thereof are shown in Table 2.

(Evaluation of Phase Stability)

Whether phase separation occurs when each photorefractive device was placed in an oven at a temperature of 60° C. for 1 month was observed. If phase separation did not occur after 1 month, the result was evaluated as "excellent," and if a relative change in the transmission of a He—Ne laser beam after one month was 10% or less, the result was evaluated as "good."

(Evaluation of Photoconductivity)

Regarding a photorefractive material, to exhibit photo refractivity, a space charge field needs to be formed according to an intensity of light inside the material. The size and formation speed of the inner space charge field mainly depend on photoconductivity. In this regard, photoconductivity is affected by an amount of generated photocharge and mobility of photocharge. Photoconductivity was measured as follows: 5,000 V of direct voltage was applied to a photorefractive device (having a thickness of 100 μm) under standard conditions (1 atm, 25° C.), and then the current of the photorefractive device per unit area was measured under the condition of He—Ne laser having a wavelength of 633 nm and 10 mW/cm$^2$.

(Gain Factor (Two-Beam Coupling (2BC)) Measurement)

As the result of the formation of an inner space charge field, the nonlinear optical chromophore rearranges, and accordingly, a spatial refractive index of the photorefractive device is modulated. Regarding the photorefractive phenomenon, the change in refractive index induced by light does not match the distribution of light, and thus a spatially shifted phase difference occurs. As a result of the phase difference, an energy transition phenomenon occurs between two laser beams irradiated to a photorefractive material. That is, energy from one beam is transitioned to the other beam. An intensity (γ) of energy transition between two beams may be measured by irradiating two p-polarized beams ($I_1$, $I_2$) to a sample and measuring intensities of transmitted beams: $\gamma=[I_{1(I2\neq 0)}/I_{1(I2=0)}]$, wherein $I_{1(I2=0)}$ is an intensity of $I_1$ transmitted through a sample when $I_2$ is not irradiated, and $I_{1(I2\neq 0)}$ is an intensity of $I_1$ transmitted through a sample when $I_2$ is irradiated. The gain factor (Γ) is measured as follows: $\Gamma=[\ln(\gamma\cdot B)-\ln(1+\beta-\gamma)]/L$, wherein $\beta=(I_2/I_1)d$, L is a length of light path, and d is a thickness of a sample. Herein, the gain factor is measured by using a measurement method disclosed in "Appl. Phys. Lett. 94, 053302 (2009), J. Mater. Chem. 12, 858 (2002)".

(Measurement of Diffraction Efficiency)

The diffraction efficiency was measured as follows: a reading beam was irradiated onto a photorefractive lattice (that is, a diffraction lattice) formed inside a photorefractive material by two crossed writing beams, and an intensity of the diffracted reading beam was measured to determine diffraction efficiency (η). To minimize an energy transition between two writing beams, an s-polarized beam is used as a writing beam. A direction of incident reading beam is adjusted to satisfy the Bragg condition. The diffraction efficiency (η) is determined as follows: $\eta=I_{R\text{-}diffracted}/(I_{R\text{-}diffracted}+I_{R\text{-}transmitted})$, wherein $I_{R\text{-}diffracted}$ is the intensity of the reading light that is diffracted and transmitted, and $I_{R\text{-}transmitted}$ is the intensity of the reading light that is transmitted without diffraction. The measurement of diffraction efficiency is not direct evidence of the photorefractive phenomenon. First, using only a material that shows an energy transition when two beam coupling (2BC) measurement is performed, it is confirmed that the diffraction of the reading beam occurs as the result of a photorefractive lattice (that is, a diffraction lattice), rather than other optical phenomena. Herein, diffraction efficiency is measured using a measurement method disclosed in "Appl. Phys. Lett. 94, 053302 (2009), J. Mater. Chem. 12, 858 (2002)". The change in diffraction efficiency with respect to the change in applied voltage was measured while varying the voltage applied to a photorefractive device. From the result, the voltage indicating a maximum diffraction efficiency value was determined.

TABLE 2

| | Phase stability | Photo-conductivity @50 V/μm [nA] | Gain factor @80 V/μm [cm$^{-1}$] | Maximum diffraction efficiency (@ applied voltage) |
|---|---|---|---|---|
| Example 1 | Excellent | 226 | −55 | 60% (@35 V/μm) |
| Example 2 | Good | 1,200 | −20 | 30% (@40 V/μm) |
| Comparative Example 1: | Excellent | 1 | — | — |
| Comparative Example 2: | Excellent | 30 | — | 25% (@40 V/μm) |

Referring to Table 2, the photorefractive devices manufactured according to Examples 1 and 2 have higher photoconductivity, greater gain factor, higher maximum diffraction efficiency, and higher applied voltage, which indicates a maximum diffraction efficiency, than the photorefractive devices manufactured according to Comparative Examples 1 and 2.

Meanwhile, as a result of the absence of a photocharge generator, the photorefractive device manufactured according to Comparative Example 1 did not have a photoconductivity at a wavelength of 633 nm and thus did not exhibit photorefractive phenomenon (that is, there is no diffraction efficiency). The photorefractive device manufactured according to Comparative Example 2 has low photoconductivity, and thus exhibits relatively low photorefractive efficiency (that is, maximum diffraction efficiency) as compared to the photorefractive devices prepared according to Examples 1 and 2.

Figure 3:
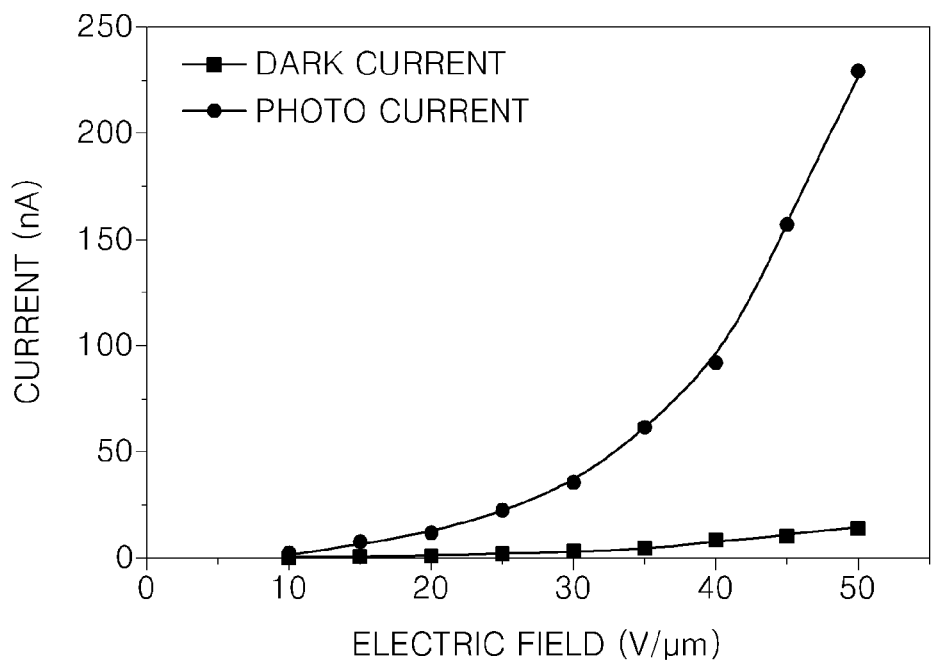
FIG. 3 is a graph showing current as a function of the electric field of a photorefractive device prepared according to Example 1.

In order to exhibit photorefractive phenomenon, a photorefractive material needs to simultaneously exhibit photoconductivity and secondary nonlinear optical characteristics. Accordingly, it is necessary to measure the photoconductivity and electric optical characteristics of a photorefractive material. FIG. 3 shows a graph of current measured as a function of an electric field for the photorefractive device of Example 1.

Referring to FIG. 3, when light was not irradiated, the photorefractive device manufactured according to Example 1 had very low current (dark current), and when light was irradiated, the photorefractive device manufactured according to Example 1 had very high current (photocurrent). Such results show that the photocharge generator (that is, RGO) of Example 1 effectively functions.

Figure 4:
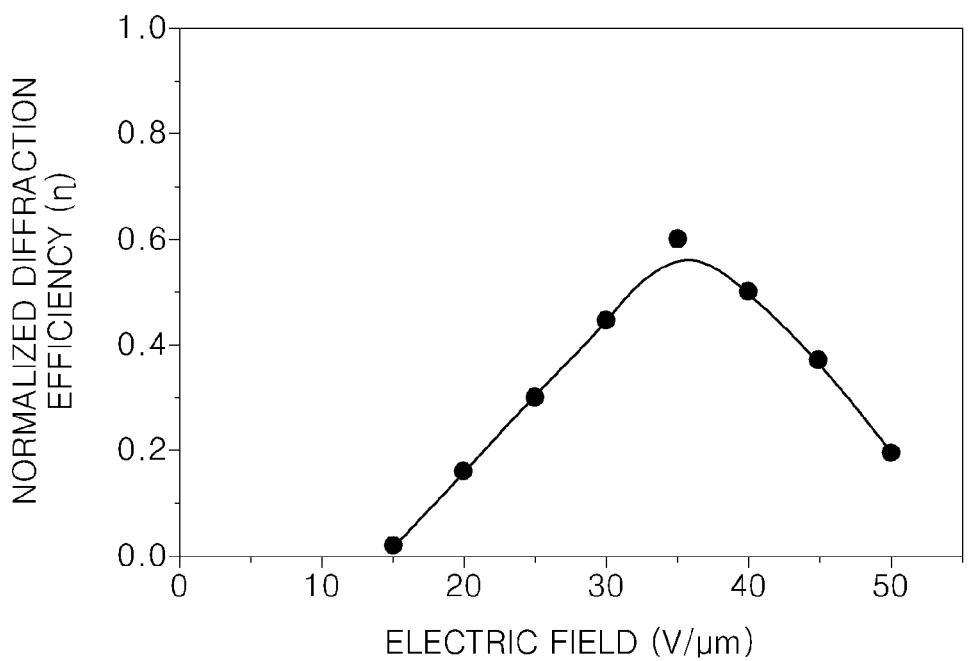
FIG. 4 is a graph showing refraction efficiency as a function of the electric field resulting from four wave mixing in the photorefractive device prepared according to Example 1.

In terms of actual application, the most important factor is the diffraction efficiency of a photorefractive material. FIG. 4 shows a graph measuring the diffraction efficiency as a function of the electric field, which is generated due to four wave mixing (FWM), for the photorefractive device of Example 1. Referring to FIG. 4, the photorefractive device of Example 1 has very high diffraction efficiency suitable for use in a hologram display device.

A photorefractive polymer composite according to an embodiment includes a graphite-based photocharge generator. As a result of the inclusion of the graphite-based photocharge generator, the photorefractive polymer composite may exhibit photosensitivity within a wide wavelength range.

In addition, a photorefractive device according to an embodiment may be used in 3D printers, 3D displays, real-time stereoscopic holography, light computing, 3D information storage, or detection of nano-sized errors using non-destructive hologram.

It should be understood that the exemplary embodiments described herein should be considered to be descriptive only, and non-limiting. Descriptions of features or aspects within each embodiment should typically be considered as being available for other similar features or aspects in other embodiments.

What is claimed is:

1. A photorefractive polymer composite comprising:
   a photoconductive polymer matrix;
   a nonlinear optical chromophore;
   a plasticizer; and
   a graphite-based photocharge generator,
   wherein the graphite-based photocharge generator comprises reduced graphene oxide (RGO),
   wherein the photoconductive polymer matrix is represented by Formula 1 below:

[Formula 1]

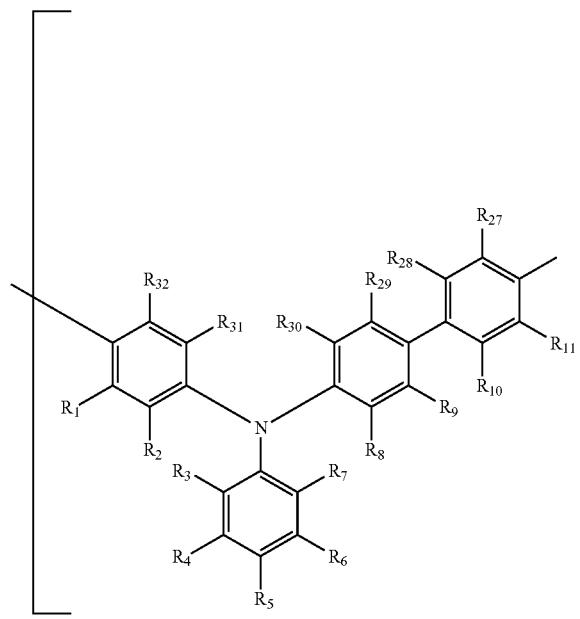

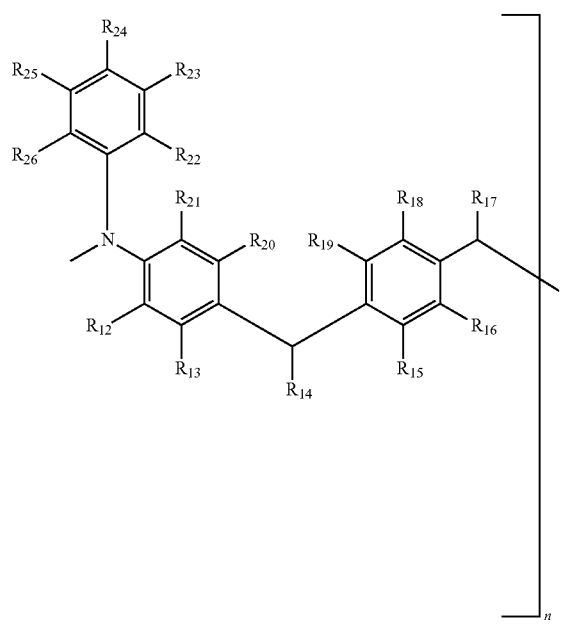

wherein n is in a range of from about 20 to about 100, and $R_1$ to $R_4$, $R_6$ to $R_{13}$, $R_{15}$ to $R_{23}$, and $R_{25}$ to $R_{32}$ are hydrogen atoms, and $R_5$, $R_{14}$ and $R_{24}$ are each independently a hydrogen atom, a linear or branched C1 to C10 alkyl group, a C6 to C11 aryl group, a C5 to C10 heteroaryl group, a C2 to C10 alkene group, a C2 to C10 alkyne group, a C3 to C10 cycloalkyl group, a C3 to C10 cycloalkene group, a C3 to C10 cycloalkyne group, a C1 to C10 heteroalkyl group, a C2 to C10 heteroalkenyl group, or a C2 to C10 heteroalkynyl group, and wherein a diffraction lattice is formed inside the photorefractive polymer composite by two crossed writing beams, and the diffraction lattice is removed by an erase beam.

2. The photorefractive polymer composite of claim 1, wherein
   the photoconductive polymer matrix comprises a repeating unit having at least one triarylamine moiety.

3. The photorefractive polymer composite of claim 1, wherein
   a weight average molecular weight of the photoconductive polymer matrix is in a range of from about 5,000 to about 500,000.

4. The photorefractive polymer composite of claim 1, wherein
   an amount of the photoconductive polymer matrix is in a range of from about 30 to about 70 parts by weight, based on 100 parts by weight of the photorefractive polymer composite.

5. The photorefractive polymer composite of claim 1, wherein the nonlinear optical chromophore comprises 2-[3-[(E)-2-(piperidino)-1-ethenyl]-5,5-dimethyl-2-cyclohexenyliden]malononitrile (P-IP-DC), 2-{3-[(E)-2-(dibutylamino)-1-ethenyl]-5,5-dimethyl-2-cyclohexenyliden}malononitrile (DB-IP-DC), dicyanostyrene derivative 4-piperidinobenzylidene-malonitrile (PDCST), 2,5-dimethyl-4-(p-phenylazo)anisole (DMNPAA), 4-di(2-methoxyethyl)aminobenzylidene malononitrile (AODCST), 3-(N,N-di-n-butylaniline-4-yl)-1-dicyanomethylidene-2-cyclohexene (DBDC), (2-dicyanomethylene-3-cyano-2,5-dihydrofuran)-6 (DCDHF), 2,N,N-dihexylamino-7-dicyanomethylidenyl-3,4,5,6,10-pentahydronaphthalene (DHADC-MPN), aminothienyl-dioxocyano-pyridine)-3 (ATOP), (3-(2-(4-(N,N-diethylamino)phenyl)ethenyl)-5,5-dimethyl-1,2-cyclohexenylidene)propanedinitrile (Lemke-E), 1-n-butoxyl-2,5-dimethyl-4-(4'-nitrophenylazo)benzene (BDMNPAB), fluorinated cyano-tolane chromophore (FTCN), diethylamino-nitrostyrene (DEANST), or a combination thereof.

6. The photorefractive polymer composite of claim 1, wherein an amount of the nonlinear optical chromophore is in a range of from about 10 to about 100 parts by weight based on 100 parts by weight of the photoconductive polymer matrix.

7. The photorefractive polymer composite of claim 1, wherein the plasticizer comprises benzylbutyl phthalate (BBP), diphenyl phthalate (DPP), di-2-ethylhexyl phthalate (DOP), N-ethylcarbazole (ECZ), n-(2-ethylhexyl)-n-(3-methylphenyl)-aniline (EHMPA), dimethylphthalate (DMP), diethylphthalate (DEP), diisobutylphtalate (DIBP), dibutylphtalate (DBP), diheptylphtalate (DHP), dioctyl phthalate (DIOP), di-n-octyl phthalate (DnOP), dinonylphthalate (DNP), diisodecylphthalate (DIDP), ditridecylphthalate (DTDP), dicyclohexyl phthalate (DCHP), butyllauryl phthalate (BLP), dioctyl adipate (DOA), diisodecyl adipate (DIDA), dioctyl azelate (DOZ), dibutyl sebacate (DBS), dioctyl sebacate (DOS), dioctyl terephthalate (DOTP), diethylene glycol dibenzoate (DEDB), butyl oleate (BO), tricresyl phosphate (TCP), trioctyl phosphate (TOP), triphenyl phosphate (TPP), trichloroethyl phosphate (TCEP), or a combination thereof.

8. The photorefractive polymer composite of claim 1, wherein an amount of the plasticizer is in a range of from about 10 to about 40 parts by weight based on 100 parts by weight of the photoconductive polymer matrix.

9. The photorefractive polymer composite of claim 1, wherein an amount of the reduced graphene oxide (RGO) is in a range of from about 0.001 to about 1.0 parts by weight based on 100 parts by weight of the photoconductive polymer matrix.

10. A photorefractive device comprising:

a first electrode;

a second electrode facing the first electrode; and the photorefractive polymer composite of claim 1 interposed between the first electrode and the second electrode.

11. A hologram display device comprising the photorefractive device of claim 10.

12. The photorefractive device of claim 10 further comprising a laser, wherein no laser in the photorefractive device has an intensity higher than 1 W/cm$^2$.

13. The photorefractive device of claim 12, wherein the maximum diffraction efficiency of the photorefractive device is about 60% at 35V/μm.

14. The photorefractive device of claim 12, wherein the maximum diffraction efficiency of the photorefractive device is about 30% at 40V/μm.

15. The photorefractive device of claim 12, wherein the maximum diffraction efficiency of the photorefractive device is at least about 60% at 35V/μm.

16. The photorefractive device of claim 12, wherein the maximum diffraction efficiency of the photorefractive device is at least about 30% at 40V/μm.

17. A method of improving the maximum diffraction efficiency of a photorefractive polymer composite comprising a photoconductive polymer matrix, a nonlinear optical chromophore, and a plasticizer, the method comprising the step of adding a graphite-based photocharge generator to the photorefractive polymer composite in an amount sufficient to improve the maximum diffraction efficiency of the photorefractive polymer composite, wherein the graphite-based photocharge generator comprises reduced graphene oxide (RGO), wherein the photoconductive polymer matrix is represented by Formula 1 below:

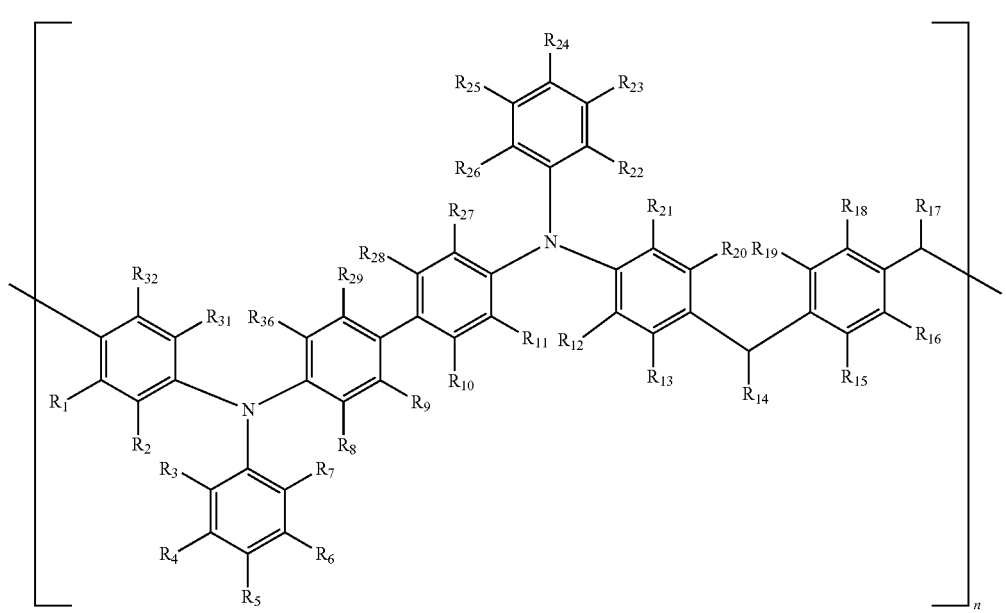

[Formula 1]

wherein n is in a range of from about 20 to about 100, and $R_1$ to $R_4$, $R_6$ to $R_{13}$, $R_{15}$ to $R_{23}$, and $R_{25}$ to $R_{32}$ are hydrogen atoms, and $R_5$, $R_{14}$ and $R_{24}$ are each independently a hydrogen atom, a linear or branched C1 to C10 alkyl group, a C6 to C11 aryl group, a C5 to C10 heteroaryl group, a C2 to C10 alkene group, a C2 to C10 alkyne group, a C3 to C10 cycloalkyl group, a C3 to C10 cycloalkene group, a C3 to C10 cycloalkyne group, a C1 to C10 heteroalkyl group, a C2 to C10 heteroalkenyl group, or a C2 to C10 heteroalkynyl group, and wherein a diffraction lattice is formed inside the photorefractive polymer composite by two crossed writing beams, and the diffraction lattice is removed by an erase beam.

* * * * *